Aug. 16, 1949.  A. H. HEMKER  2,479,355

LIVESTOCK WATERING DEVICE

Filed Nov. 16, 1946

Inventor:
Arthur H. Hemker,
by Claude H. Mott
His Attorney.

Patented Aug. 16, 1949

2,479,355

UNITED STATES PATENT OFFICE 2,479,355

LIVESTOCK WATERING DEVICE

Arthur H. Hemker, Schenectady, N. Y., assignor to General Electric Company, a corporation of New York Application November 16, 1946, Serial No. 710,380

3 Claims. (Cl. 219—38)

My invention relates to livestock watering devices, more particularly to electrically heated stock watering devices, and has for its object a simple, reliable and low cost livestock watering device which is supported by setting it into the ground.

In carrying out my invention in one form I provide a metal casing which is closed at the bottom against the entrance of water and has a drinking cup mounted in the top so as to form a water-impervious chamber. This casing is arranged to be set into the ground suitable distances to accommodate the likestock using the cup, such as cattle, sheep, horses or hogs.

Inside the casing are two electric heaters, one for the drinking cup and the other for a water supply pipe extending into the casing through the bottom wall. Also in the chamber is a temperature responsive control switch for controlling the heaters in response to the temperature of the water in the cup, together with electric connections between the heaters, the control switch and electric supply conductors which are brought in through the bottom wall. Water-tight connections are provided around the water pipe and the electric conductors.

Figure 1:
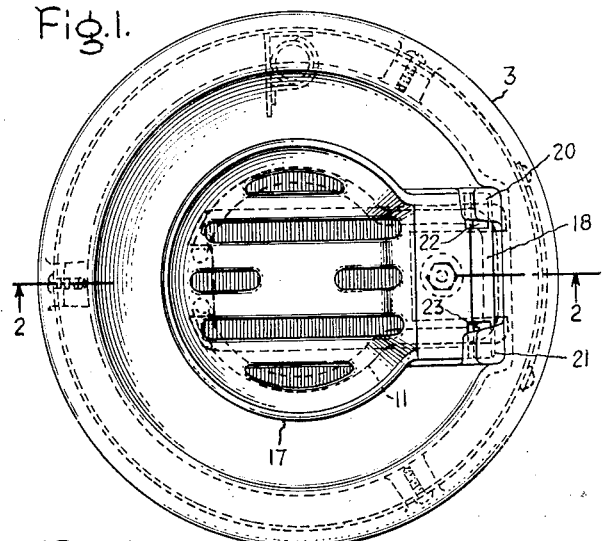
Figure 2:
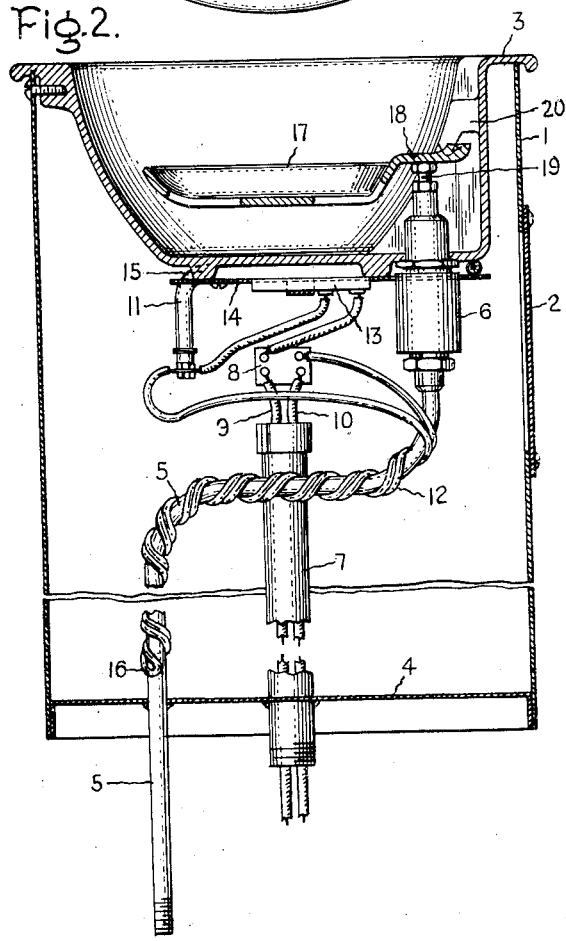
Figure 3:
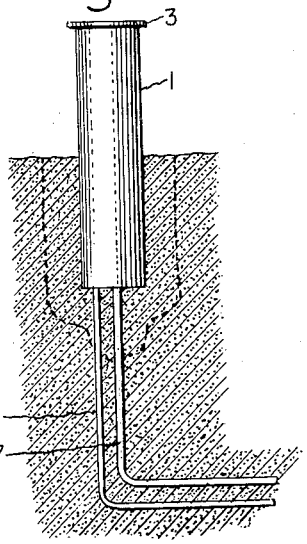
Figure 4:
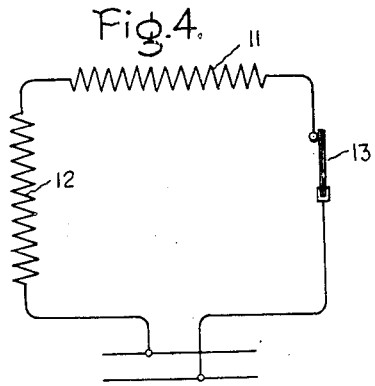

For a more complete understanding of my invention reference should be had to the accompanying drawing, Fig. 1 of which is a plan view of a stock drinking cup embodying my invention; Fig. 2 is a sectional view along the line 2—2 of Fig. 1 looking in the direction of the arrows; Fig. 3 is an elevation view to a smaller scale showing the device mounted in the ground, while Fig. 4 is a wiring diagram of the electric heating circuit.

Referring to the drawing, in one form of my invention I provide an elongated cylindrical water-impervious metal side wall forming a support or casing 1 provided with a removable sealed door plate 2 to afford access to the interior. This support 1 has a cast metal drinking cup 3 mounted at one end and, as shown in Fig. 3, the supporting casing is mounted in the ground in an upright position with the drinking cup uppermost. I have found that the supporting casing 1 should be about twelve inches in diameter and four feet in length. It should be buried into the ground about two feet for cattle and horses, two and one-half feet for sheep, and three feet for hogs. Preferably, its lower end is embedded into a quantity of heat insulating material, such as cinders. The casing is provided with a metal water-impervious bottom wall 4 for sealing the casing to keep out water. As shown, a flange around the top of the drinking cup overlaps the top of the casing so as to prevent water from getting into the top of the casing. Therefore, the casing, bottom wall and drinking cup form a closed water-impervious chamber.

Water is supplied to the cup from a pipe 5 which extends underground to a point below the casing and then upward through the bottom wall 4 into the interior of the casing where it is connected to a suitable supply valve 6 for the cup. As shown the valve 6 is mounted on the bottom of the cup and extends therethrough. I contemplate that the water supply pipe will be buried underground to a depth below the frost level in cold weather to the point where it extends upward into the casing.

Likewise, electric connections are led in through the bottom of the casing by means of a conduit 7 which extends upward to a point adjacent an electric connection block 8 secured to the side wall of the supporting casing. Sealed joints preferably brazed joints, are provided in the bottom wall 4 around the pipe 5 and conduit 7. As shown, two electrically insulated electric supply conductors 9 and 10 extend through the conduit and are connected to electric supply connections or terminals on the block 8 made of electrically insulating material.

From the block 8 electric connections are led to the terminals of an electric heater 11 secured to the bottom of the drinking cup and an electric heater 12 which is wrapped around the water supply pipe 5, these two heaters being connected in electric series relation with each other, as shown in Fig. 4. Also a suitable thermostatically operated switch 13 is connected in circuit with the heaters, this thermostatic switch being mounted on a plate 14 secured to the bottom of the cup so that the thermostat is responsive to the temperature of the water in the cup.

As shown, the electric heater 11 is a metal sheathed resistance heater bent into a loop form and clamped against the bottom of the cup by the plate 14. Preferably this heater is of the type described and claimed in U. S. Patent 2,112,729, issued on March 29, 1938, to Charles C. Abbott. An annular spacing ridge 15 is provided on the bottom of the cup to which the plate 14 is secured by suitable screws. As shown the heater 11 extends around the ridge 15 and also around the valve 6, the ridge having a height somewhat less than the diameter of the heater 11 so that the heater is clamped by the plate 14 against the bottom of the cup.

The heater 12 has a relatively low electric resistance as compared with the resistance of the heater 11 so that it generates only a relatively small amount of heat as compared with the heater 11. This heater 12 is preferably of the type in use for heating the soil in nurseries and consists of a length of resistance heating wire covered with electric insulation which is in turn covered with a layer of lead. As shown in the drawing, the heater 12 is bent together at approximately its center to form two lengths which are wrapped in a plurality of double convolutions around the water pipe 5 with the double end 16 at the lower end of the pipe and the two ends of the heater adjacent the upper end of the pipe to facilitate connection in the heating circuit.

The water valve 6 is provided with an operating plunger 19 which normally is spring pressed upward to a position to close the valve, as shown in the drawing. The plunger may be depressed by the livestock to open the valve and admit water to the cup by means of a treadle 17 extending in parallel spaced relation with the bottom of the cup and having a flange supporting portion 18 on one side resting on the plunger 19 and at its end extending under two spaced-apart pivot projections 20 and 21 secured to the side wall of the cup, these projections each having a pointed bearing on its lower end which bearings extend into V-shaped recesses 22 and 23 forming bearings in the end of the flange 18.

I have found that this construction without heat insulating lagging around the supporting casing or the water pipe inside the casing provides a desirable low cost construction while, at the same time, giving a low cost of operation for electric current during cold weather. In a typical device having a heater 11 of 170 watts capacity and a heater 12 of 50 watts capacity, the air temperature inside the casing was below a freezing temperature in extremely cold weather but the heater 12 wrapped around the pipe effectively prevented freezing of the water in the pipe. The thermostatic switch 13 is preferably set to open the heating circuit in response to a temperature of about 45 degrees F. in the water in the cup. The thermostat, of course, will actually be at a somewhat lower temperature when it opens the heating circuit because of the temperature drop between the water and the thermostat itself mounted on the plate 14. In a typical device with a minus 30 degrees F. temperature outside, I found that the air temperature inside the supporting casing was minus 10 degrees F. but, nevertheless, the water in the pipe 5 and the cup did not freeze.

I have found that the casing 1 when buried in the ground about two feet forms a very reliable and sturdy support for the drinking cup, the casing being secured in place by the ground against bumping and kicking of the casing by large livestock such as cattle and horses. The casing is made of a metal of substantial thickness to provide the required strength.

Preferably, the copper water pipe 5, which is preferably three eighths inch copper tubing, extends downward two feet or more below the bottom wall 4 of the casing. This pipe can be bent at right angles to facilitate its connection with a water supply pipe and it bends freely to provide for settling of the tank in the ground. If desired, a suitable underground twin electric supply cable, such as a lead covered cable, can be inserted into the conduit 7 and the lower end of the conduit closed and sealed by suitable sealing compound.

The copper pipe 5 also serves the purpose of conducting heat below the support thereby to prevent freezing of the water in the pipe. I have found that this conduction of heat is effective to prevent freezing even though the frost line in cold weather may be at a depth of four or five feet with the tank buried two feet.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

What I claim as new and desire to secure by Letters Patent of the United States is:

1. A livestock watering device comprising an elongated metal casing, a bottom wall sealing one end of said casing, a drinking cup mounted in the other end of said casing having a water-impervious connection with said casing, said casing being constructed and arranged to be mounted in the ground in an upright position with the drinking cup uppermost and with its lower end extending into the ground so as to secure said casing against bumping and kicking by livestock, a water supply pipe extending through said bottom wall into the interior of said casing, a watertight joint between said pipe and said bottom wall, a valve connecting said pipe to said cup, a treadle in said cup connected to said valve and constructed and arranged to be depressed by livestock to open said valve, electric supply connections extending through said bottom wall into the interior of said casing, a water-tight joint between said supply connections and said bottom wall, an electric heater for said cup, an electrically insulated heating cable wrapped around said water supply pipe in said casing, a temperature responsive control switch secured to the bottom of said cup, and electric conductors in said casing connecting said heaters in series relation with each other and with said switch so that said heaters are both controlled in response to the temperature of the water in said cup.

2. A livestock watering device comprising an elongated water-impervious metal wall forming a casing arranged to be set into the ground for a substantial distance in an upright position, a metal bottom wall closing the lower end of said casing against the entrance of water, a drinking cup mounted on the upper end of said casing forming with said casing and said bottom wall a closed water-impervious chamber, a metal water supply pipe extending through one of said walls into the interior of said chamber, a metal conduit extending through one of said walls into the interior of said chamber, water-tight connections between said pipe and said wall and between said conduit and said wall, a valve connecting said water pipe to said cup, a treadle in said cup associated with said valve and arranged to be depressed by livestock to open said valve and admit water to said cup, an electric heater in said chamber arranged to heat said cup, an electric heater in said chamber arranged to heat said water supply pipe both in said chamber and on the exterior of said chamber to prevent the freezing of water in said pipe, a temperature responsive control switch secured to said cup so as to be responsive to the temperature of the water in said cup, electric supply conductors extending through said conduit into said chamber, and electric connections in said chamber connecting said heaters to said electric supply conductors in circuit with said switch so that the connection of both heaters to said supply conductors is controlled in response to the temperature of the water in said cup.

3. A livestock watering device comprising an elongated water-impervious metal casing arranged to be set into the ground for a substantial distance in an upright position so as to be secured firmly in the ground against bumping and kicking by livestock, a metal bottom wall closing the lower end of said casing against the entrance of water, a drinking cup mounted in the upper end of said casing having a flange in overlapping relation with the upper end of said casing thereby to form with said casing and said bottom wall a closed water-impervious chamber, a metal water supply pipe extending through said bottom wall into the interior of said chamber, a metal conduit extending through said bottom wall into the interior of said chamber, water-tight connections between said pipe and said bottom wall and between said conduit and said bottom wall, a valve connecting said water pipe to said cup, a treadle in said cup associated with said valve and arranged to be depressed by livestock to open said valve and admit water to said cup, a relatively high wattage electric heater in said chamber secured to said cup, a relatively low wattage electric heater in said chamber arranged to heat said water supply pipe both in said chamber and below said bottom wall on the exterior of said chamber to prevent the freezing of water in said pipe, a temperature responsive control switch secured to said cup so as to be responsive to the temperature of the water in said cup, electric supply conductors extending through said conduit into said chamber, and electric connections in said chamber connecting said heaters to said electric supply conductors in circuit with said switch so that the connection of both heaters to said supply conductors is controlled in response to the temperature of the water in said cup.

ARTHUR H. HEMKER.

REFERENCES CITED

The following references are of record in the file of this patent:

UNITED STATES PATENTS

| Number | Name | Date |
| --- | --- | --- |
| 794,326 | Thornburg | July 11, 1905 |
| 854,615 | Vorheis et al. | May 21, 1907 |
| 1,019,881 | Byrd | Mar. 12, 1912 |
| 1,144,591 | Guidinger | June 29, 1915 |
| 1,296,586 | Louden | Mar. 4, 1919 |

FOREIGN PATENTS

| Number | Country | Date |
| --- | --- | --- |
| 13,469 | Sweden | Dec. 14, 1901 |